United States Patent
Pascal et al.

(10) Patent No.: US 6,287,202 B1
(45) Date of Patent: *Sep. 11, 2001

(54) DYNAMIC TOURNAMENT GAMING METHOD AND SYSTEM

(75) Inventors: Andrew Pascal, Woodside; Louis David Giacalone, Jr., Palo Alto; Michael Barnett, Santa Clara, all of CA (US)

(73) Assignee: Silicon Gaming, Inc., Las Vegas, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/672,775

(22) Filed: Jun. 28, 1996

(51) Int. Cl.[7] ........................................ A63F 9/24
(52) U.S. Cl. .................... 463/42; 463/25; 700/93
(58) Field of Search .................. 364/410, 411, 364/412; 463/1, 42, 29, 30, 40, 43, 16–20; 340/323 R; 273/292, 293; 700/91–93

(56) References Cited

U.S. PATENT DOCUMENTS

| | | | |
|---|---|---|---|
| 4,572,509 | * | 2/1986 | Sitrick ................................. 463/42 |
| 4,998,199 | * | 3/1991 | Tashiro et al. ...................... 463/42 |
| 5,083,271 | * | 1/1992 | Thacher et al. ..................... 463/42 |
| 5,114,155 | * | 5/1992 | Tillery et al. ....................... 463/42 |
| 5,259,613 | * | 11/1993 | Marnell, II ......................... 463/42 |
| 5,359,510 | * | 10/1994 | Sabalianskas ...................... 364/410 |
| 5,544,892 | * | 8/1996 | Breeding ............................ 273/292 |
| 5,655,961 | * | 8/1997 | Acres et al. ........................ 463/42 |
| 5,711,715 | * | 1/1998 | Ringo et al. ....................... 273/293 |
| 5,755,621 | * | 5/1998 | Marks et al. ....................... 463/42 |
| 5,779,549 | * | 7/1998 | Walker et al. ..................... 463/42 |
| 5,833,540 | * | 11/1998 | Miodunski et al. ................ 463/42 |
| 5,917,725 | * | 6/1999 | Thacher et al. .................... 700/91 |

FOREIGN PATENT DOCUMENTS

4222896 * 1/1994 (DE) .

* cited by examiner

Primary Examiner—Mark Sager
(74) Attorney, Agent, or Firm—Oppenheimer Wolff & Donnelly LLP; Claude A. S. Hamrick; Anthony Diepenbrock

(57) ABSTRACT

Dynamic tournament gaming method and system, including the provision of a plurality of gaming terminals selectively interlinkable together with a host terminal so that current players of the terminals desiring to participate in group tournament play can be notified of the opportunity and provided with the choice to play or not. If a current player chooses to play, he so signifies, enters his entry fee into the terminal, and awaits start of the event. Upon start of the tournament by the host terminal, the player will play the tournament game over and over as fast as possible to accumulate as many points as possible during a particular pre-announced tournament period. The host terminal will continuously monitor the terminals of all play participants, dynamically record play status, and control termination of the game period. It will also conduct an accounting of the results, issue win results notification, and perhaps provide remote pay-out of game winnings.

19 Claims, 4 Drawing Sheets

DYNAMIC TOURNAMENT GAMING METHOD AND SYSTEM

BACKGROUND OF THE INVENTION

1. Field of the Invention

The present invention relates generally to apparatus for playing games of chance, and more particularly to a method and apparatus for allowing a number of players to participate simultaneously in a tournament using a plurality of gaming terminals networked together and under control of a master terminal.

2. Brief Description of the Prior Art

Slot tournaments are a popular slot merchandising practice in casinos. A slot tournament is a group function wherein a player pays a set amount of money to join the tournament, and his entry fee goes into a pot which is paid out to the tournament winner or winners, less the house percentage. The machines used for the tournament are specially configured machines that, upon the issuance of a "start" command by a game controller, allow the players to play as fast as they can without requiring that coins be put into the machines. The wins, or "points", are accumulated, held and displayed by each machine as points. At the end of a fixed period of time, a "stop" command is given, and all of the machines are disabled. The winner is the person having the highest accumulated score of win points obtained during the tournament period. In most tournaments the winner takes the entire pot.

Currently, tournaments must be run on specially set-up machines in a special area, and there must be at least one live host to run the game. Moreover, the games must be configured, tested and certified as being equal in every respect so that each player has an equal chance to win. Heretofore the machines used for such tournament were carefully selected, but ordinary casino-type slot machines which were enabled at a tournament "start" time and disabled at a tournament "end" time. The accumulated score of each gaming unit had to be visually acquired and recorded by the tournament host, an accounting of all scores accumulated and processed, and a winner orally announced or otherwise posted. The circumstance and machine requirements practically dictated that all machines be located in a single vicinity or room, and that they be dedicated to tournament play. This, of course, limits the opportunity of the general public to have access to the tournament, and makes the tournament costly to conduct on the part of the gaming establishment because it must provide hosts or monitors, dedicate certain machines to tournament use, and provide a suitable facility for the conduct of the tournament.

There is thus a need for a new system and apparatus using state-of-the-art technology to improve all aspects of the conduct of tournament play, e.g., make tournament play more available to all who would enjoy the play, simplify the establishment's monitoring requirements, and reduce overhead expense.

SUMMARY OF THE PRESENT INVENTION

It is therefore a principal object of the present invention to provide a method and system of the type described which makes it possible to conduct a slot tournament using any of a plurality of gaming terminals spread throughout a casino.

Another object of the present invention is to provide a plurality of networked gaming terminals all in communication with, and under control of, a host terminal.

A further objective of the present invention is to provide a method and system of the type described which allows a host or master terminal to automatically communicate with a plurality of gaming terminals and offer to the current player of each terminal the opportunity to play in a tournament without leaving his position on the casino floor.

Still another objective of the present invention is to provide a method and system of the type disclosed which has improved in terminal marketing capability.

Briefly, a preferred embodiment of the present invention includes the provision of a plurality of gaming terminals selectively interlinkable together with a host terminal so that current players of the terminals desiring to participate in group tournament play can be notified of the opportunity and provided with the choice to play or not. If a current player chooses to play, he so signifies, enters his entry fee into the terminal, and awaits start of the event. Upon start of the tournament by the host terminal, the player will play the tournament game over and over as fast as possible to accumulate as many points as possible during a particular pre-announced tournament period. The host terminal will continuously monitor the terminals of all play participants, dynamically record play status, and control termination of the game period. It will also conduct an accounting of the results, issue win results notification, and perhaps provide remote pay-out of game winnings.

An important advantage of the present invention is that it does not require dedicated terminals; i.e., any qualified terminal in the facility can be used and any current player of the gaming units can elect to play.

Another advantage of the present invention is that at most it requires a single terminal operator, and alternatively, the tournament could be run by a pre-programmed but unmanned host terminal.

Still another advantage of the present invention is that it enhances public access to tournament play.

Yet another advantage of the present invention is that play is not limited to a single room, particular machines, or even the same casino facility or location.

These and other objects and advantages of the present invention will no doubt become apparent to those skilled in the art following a review of the detailed description of the preferred embodiment which makes reference to the several figures of the drawing.

IN THE DRAWING

DETAILED DESCRIPTION OF THE PREFERRED EMBODIMENT

Figure 1:
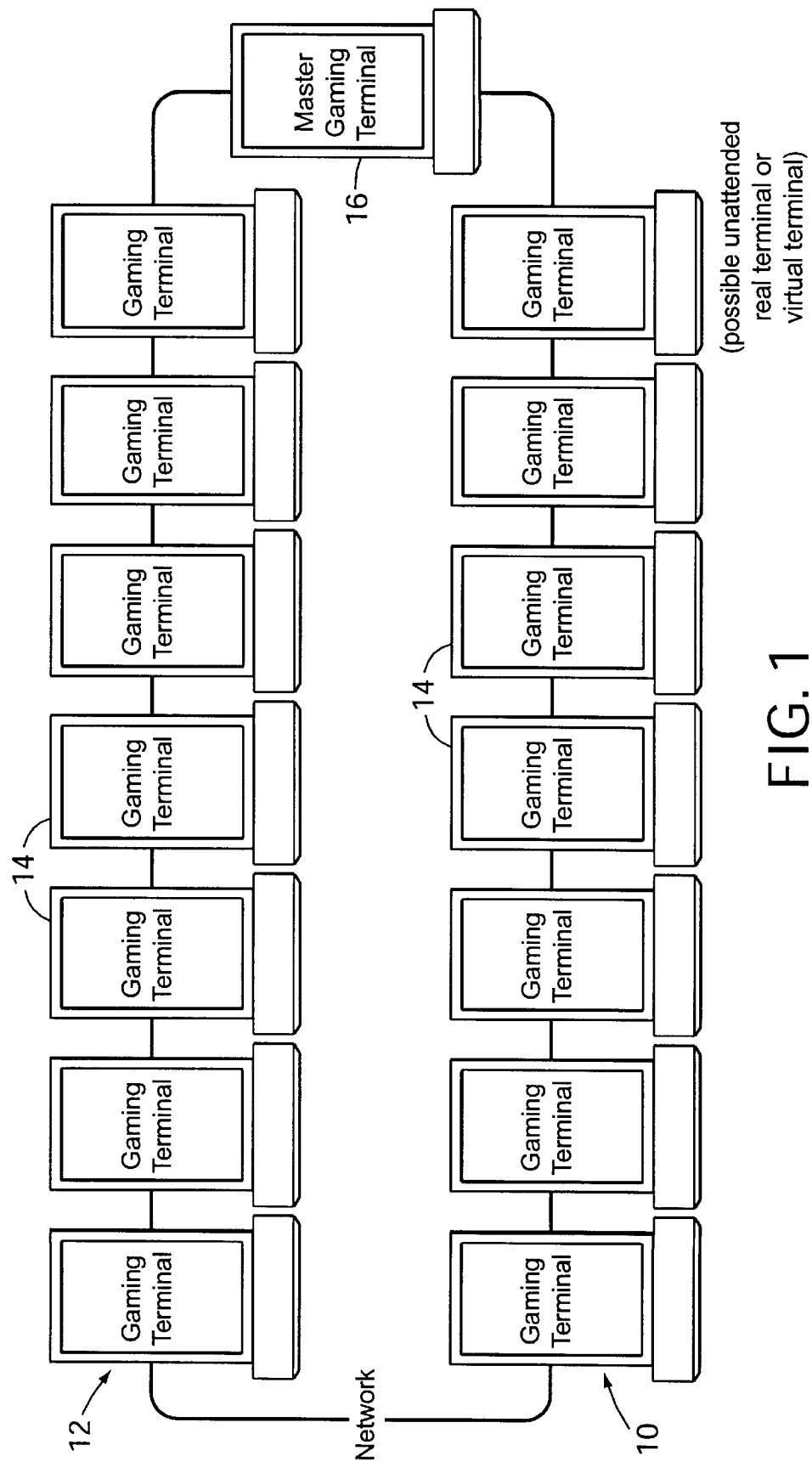
FIG. 1 is a diagram illustrating a plurality of gaming terminals linked together in a network in accordance with the present invention.

Referring now to FIG. 1 of the drawing, two banks 10 and 12 of gaming terminals (slave units) 14 are illustrated linked in a communications network with a master or host terminal 16, the latter of which may be configured as a regular gaming terminal or as a stand-alone, dedicated control unit. The network connection can be accomplished by use of any suitable communications media including cable, fiberoptics, wireless or any other suitable data-carrying linkage, and need not necessarily be limited to a local area network (LAN). In fact, the network can be comprised of a wide area network (WAN) or other type of any secure transmission medium communicatively connecting terminals at any location, proximate or remote. Although the gaming terminals are preferably of the state-of-the-art variety manufactured by Silicon Gaming, Inc. of Palo Alto, Calif., it is to be understood that the terminals can take many forms so long as they have the attributes of "sameness", meaning that when played, each will have the same probability of winning, and each can receive and transmit the data required to control the play and report the results. Having the same probability of winning is referred to in the gaming industry as having the same "percentaging model".

In accordance with the present invention, it is required that each participating gaming terminal be constrained to have precisely the same tournament period or playing time. In the preferred terminals, means is provided for informing the player that at some subsequent time a tournament is to be conducted, and that, if he wishes to participate, he should so indicate by taking some responsive action, including perhaps the deposit of a specified entry fee. The terminals should have the capability of being placed in a "wait" state during at least the final moments of the game start countdown, and should have the capability of being remotely initialized and controlled for tournament play.

In the preferred embodiment, each terminal has the capability of reporting to the master terminal its current play status, i.e., the number of points accumulated by the player. Each terminal also has the capability of being remotely enabled at the start of the tournament period, and of being remotely disabled at the end of the tournament period, or perhaps at some other arbitrary time before the end of the tournament period if some predetermined winning score has been reached by one of the terminals to end tournament play. In accordance with the present invention, the terminals and network are such that they will allow an operator or programmed host computer or terminal to remotely set up the tournament without requiring actual physical contact with the participating terminals. Only those terminals with players desiring to participate in the tournament will be communicatively linked to the master, and other non-electing terminals will continue to be available for normal game play. Furthermore, when no tournament is being conducted, all of the terminals can revert to regular play status. In accordance with the present invention, using the above-mentioned preferred gaming terminals, players can also set up their own tournaments on an ad hoc basis, and they can be managed by one of the playing terminals or by a non-playing host that is computer-generated.

To implement the preferred embodiment, there must be a network that permits communication with the machines and a master machine or network server that sets up and controls play of the tournament. The master can be programmed with predetermined "regular" starting times and buy-in amounts, and is capable of broadcasting a signal to all machines on the network causing them to run a pre-programmed announcement that a tournament is going to begin in "T"minutes, that the buy-in amount is "X" dollars, and briefly explaining how a slot tournament works. As the time approaches for beginning a tournament, additional notices can be caused to appear on the screen of machines that are currently being played to inform the players of the number of players currently enrolled in the tournament and the size of the jackpot. When the tournament begins, a modified conventional slot game is presented. For example, when the tournament starts, the user will push the "spin" button as fast as he can, without putting additional money in. Each push of the button will cause a new play cycle to be commenced. The winner is the player who accumulates the largest win points in a fixed period of time, usually ten minutes. Upon the assertion of remote commands, all of the games for logged-in terminals will start and end simultaneously.

An exemplary cycle of events for a tournament in accordance with the present invention is as follows:

1) An announcement will be given that a tournament is to begin at a particular time, e.g., "Ten minutes until a new tournament begins." Only players of eligible machines are notified of the tournament, i.e., those terminals which are capable of playing the same type of game (for example, poker, or a three-reel slot game, etc.), have the same hold percentages, and have tournament software resident on the machines (or are receptive of communicated tournament software).

2) After the announcement is given, each terminal will display an announcement of how players can "buy in". For example, players who wish to play will insert the amount of money (the "entry fee") that is required to enter the tournament.

3) Once enough players have signed up ("logged in") for the tournament, or the time to start the tournament has been reached, the logged-in terminals will be initialized for play start, and actually started simultaneously with other participating machines.

4) During tournament play, the players will accumulate points by playing the game as fast as they possibly can or as fast as they choose to play. Following each play, the game is automatically reset to await the next player input; i.e., there is no need to input a coin or hit a reset button.

5) When the announced tournament period has elapsed, or when a player reaches a predetermined tournament point goal, the tournament will end.

6) The winner will then be determined, notified and paid, and all participating machines will be returned to their normal state. In the usual case, the winner is paid a portion of the tournament pot with payment being made either from the machine itself or manually from a casino host or attendant.

There are basically two ways of starting and conducting a tournament. One uses a master machine that will start and control the progress of the tournament. The other uses a masterless group of machines that are preprogrammed to cooperatively start and jointly manage the tournament. Examples of ways in which a tournament can be started include the following:

1) Manually, via a casino host person using any networked machine;

2) At certain times during the day, for example every three hours, or at some regularly appointed time, a tournament may be started;

3) When a certain number of machines have been committed to participation, for example, when 50 machines have committed players indicating that they wish to participate in the tournament;

4) A group of players may set up a tournament themselves; for example, a group of twelve people might decide that they wish to play a tournament, in which case the machines will allow them to create, start and run their own tournament.

Regardless of the method used to start the tournaments, all machines must begin the game at the same time. Accordingly, a "start" command will be broadcast to all machines to signal the start of the tournament.

When the tournament is underway, players try to earn as many points as possible. Points are quantitatively equal to the normal credits that the slot machine normally pays for winning combinations, except that the points do not represent money in any way. If the player hits a "1,000" point combination during tournament play, he will not win $1,000; he will get 1,000 points or "points". For a "reel slot machine" style game, players start and play as many spins as possible in order to maximize the number of points earned. A master machine or network controller will continually collect the scores from all machines and form a ranked list to be broadcast to the players.

The players' scores will be communicated to a master terminal where they are accumulated and perhaps transmitted back to the terminals for display. During play, a player may be notified as to his/her standing against other players. The game is complete upon passage of a particular period of time, or upon the determination that one of the players has reached a predetermined winning level of play. Following completion of the game, the winner or winners will be notified, and payment will be made either at the winning terminal or by a host official.

Figure 2A:
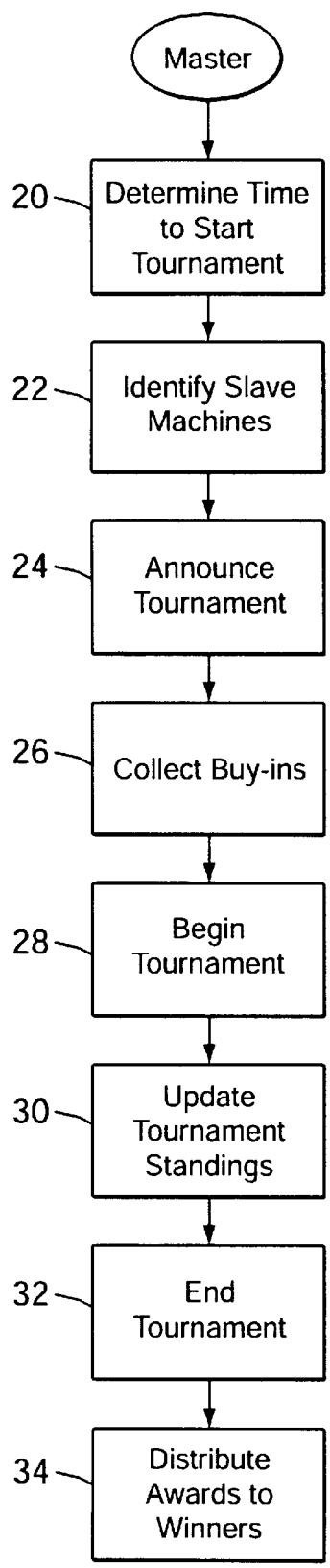
FIGS. 2a and 2b are generalized logic diagrams illustrating the tournament play process in terms of the master an slave units in accordance with the present invention.
Figure 2B:
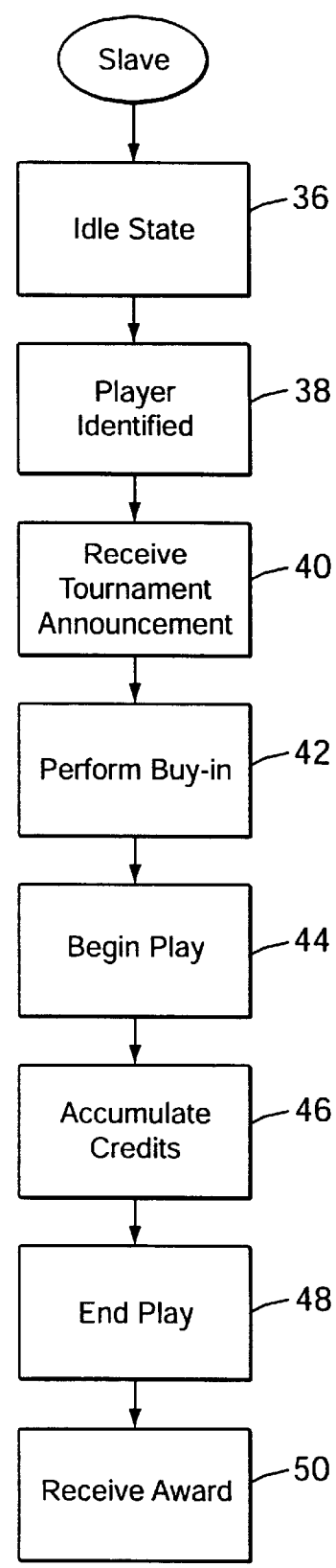

Turning now to FIGS. 2a and 2b, the principal operative steps taken by the master and slave units in conducting a tournament are presented in high-level flow diagrams. Referring first to FIG. 2a, when the master determines (20) that it is time to start a tournament, it in effect goes out and identifies slave machines (22) that it thinks are eligible for tournament play, i.e., it identifies terminals that have the appropriate percentaging, have a person sitting there waiting to play, have the right game initialized, etc. This is to say that the master identifies a group of machines that are all potentially available for tournament play. The master then announces (24) the tournament by broadcasting messages to the players telling them that the tournament is about to begin. It then collects (26) all the buy-ins (someone inserts money indicating the desire to participate in the tournament), figures out which of these machines are really going to be in the tournament based on the buy-ins, and begins the tournament (28). During the tournament, it updates (30) the tournament standings (for its own internal auditing). The standings (34) could also be broadcast to the playing terminals. Subsequently, the master ends the tournament (32), and distributes awards (34) to the winners.

On the slave side, FIG. 2b, if a particular terminal is in an idle state (36),i.e., just sitting there unattended, then chances are it is not eligible for tournament play. In order for a terminal to be eligible, it must have a player either playing or waiting to play. A terminal is classified as idle if no player is actively playing a game and for the last three minutes no one has used this machine. A player is identified (38) if during the last three minutes someone has been using this machines; there is a good chance that someone is currently sitting there playing. Such a machine is thus identified as available for tournament play. An announcement of the upcoming tournament is then sent to this unit to entice the player to enter the tournament. Alternatively, if a machine is found to be sitting idle, the master may go ahead and run the advertisement that a tournament is about to start and perhaps attract someone to sit and play. This is optional and really depends on how one identifies slave machines as eligible for tournament play.

The slave will receive the tournament announcement (40) when the master sends it, and if the player elects to play, the slave terminal will perform the buy-in function (42) by collecting money from the player and sending notice thereof to the master. When the master sends the START PLAY signal (44) to the terminal to allow the player to begin playing, the player will play the game as fast as possible and accumulate points. An END PLAY sequence (48) will terminate play when the master determines that either (1) someone has hit a certain point total or (2) a certain amount of time has elapsed. Subsequently, each slave unit will receive notice of the awards as announced by the master, and the winner, or winners, (50) will receive pay-out from their terminal.

Figure 3A:
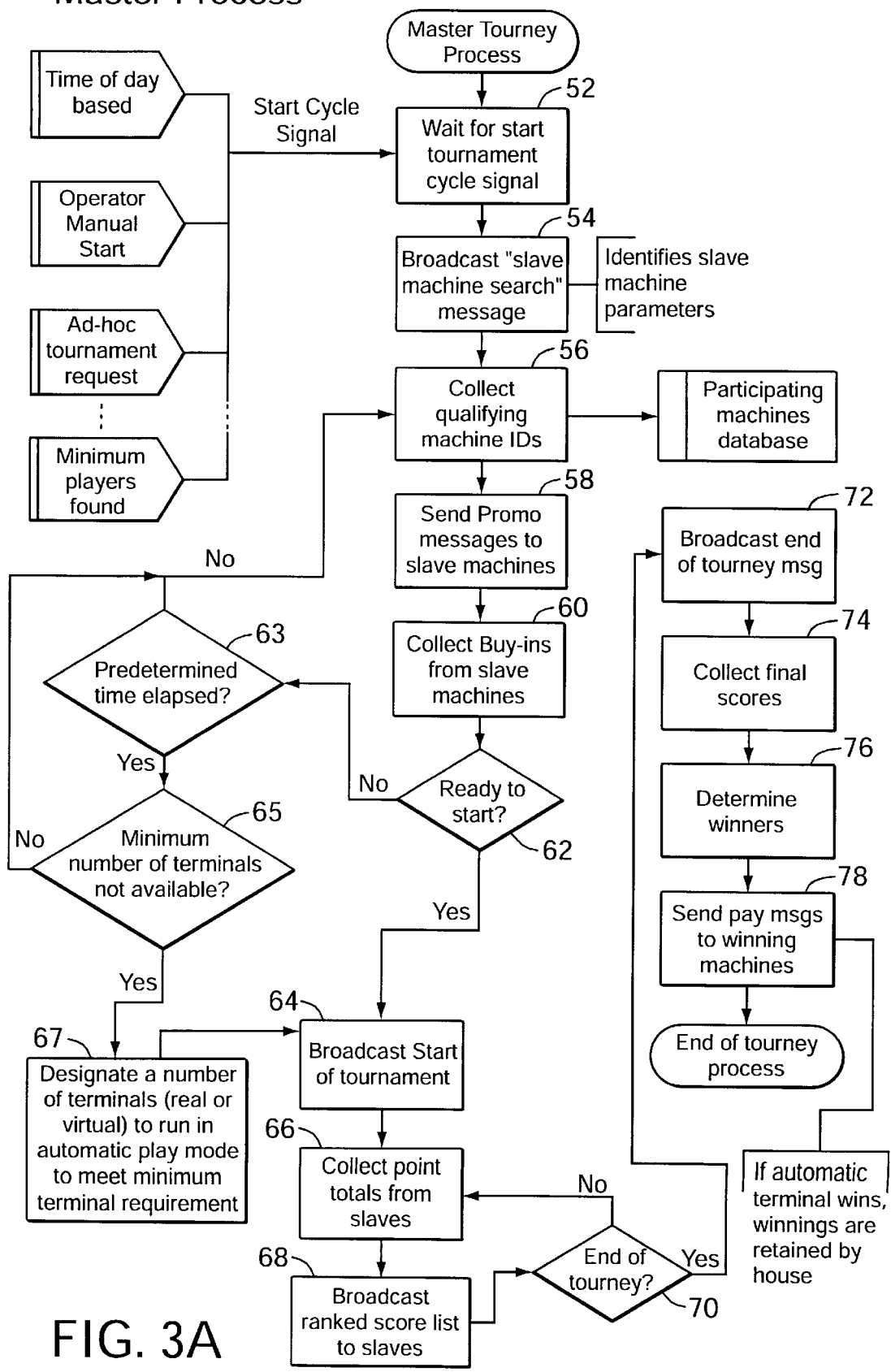
FIGS. 3a and 3b are logic flow diagrams more specifically illustrating the tournament play process implemented by the master and slave units respectively.

Referring now to FIG. 3a, the function of the master unit is presented in a more detailed flowchart. Initially, the unit is in a wait state (52) awaiting a START CYCLE signal to be generated in response to any of several conditions, such as, for example, (1) a particular time of day is reached, (2) an operator has caused a manual start, (3) an ad hoc tournament has been requested by a group of players who want to play a tournament, or (4) some minimum number of in-use machines have been identified, etc. A START signal broadcasts (54) a slave machine search message identifying the criteria a slave machine should use to determine whether or not it is eligible, i.e., it specifies some set of parameters that uniquely identifies whether or not a slave machine is available for the tournament. For example, the message might indicate that the terminal must have the Fort Knox™ game and have a 96% hold percentage. Furthermore, it might specify that the game is a three-point game, etc. All of the tournament machines have the same parameters in order to qualify.

After the master broadcasts its search for eligible slave units, it will collect the IDs (56) of those machines that are available and send some sort of promotional message (advertising to entice the player) to each slave machine (58), and it will then collect buy-ins (60) from the slave machines. This cycle will continue until the master determines that it is ready to start the game (62), i.e., it will constantly search for new machines until some condition is met, e.g. a minimum number of available terminals, a published start time is reached, etc. Once the master is ready to start, it broadcasts (64) a START signal to all of the committed slave machines, and the tournament is commenced. During the tournament the master may collect point totals (66) from the slaves as the game progresses and broadcast the score list to the slaves, so that the list can be displayed to the players. The master will continue doing this until the end of the tournament (70) has been reached, at which time the master sends out an END PLAY message (72). Several conditions ending the tournament are set out above. Once the tournament has been completed, the master collects all of the final scores (74), figures out the winner(s) (76), and sends out pay messages (78) to the slave machine(s) of the winner(s).

Figure 3B:
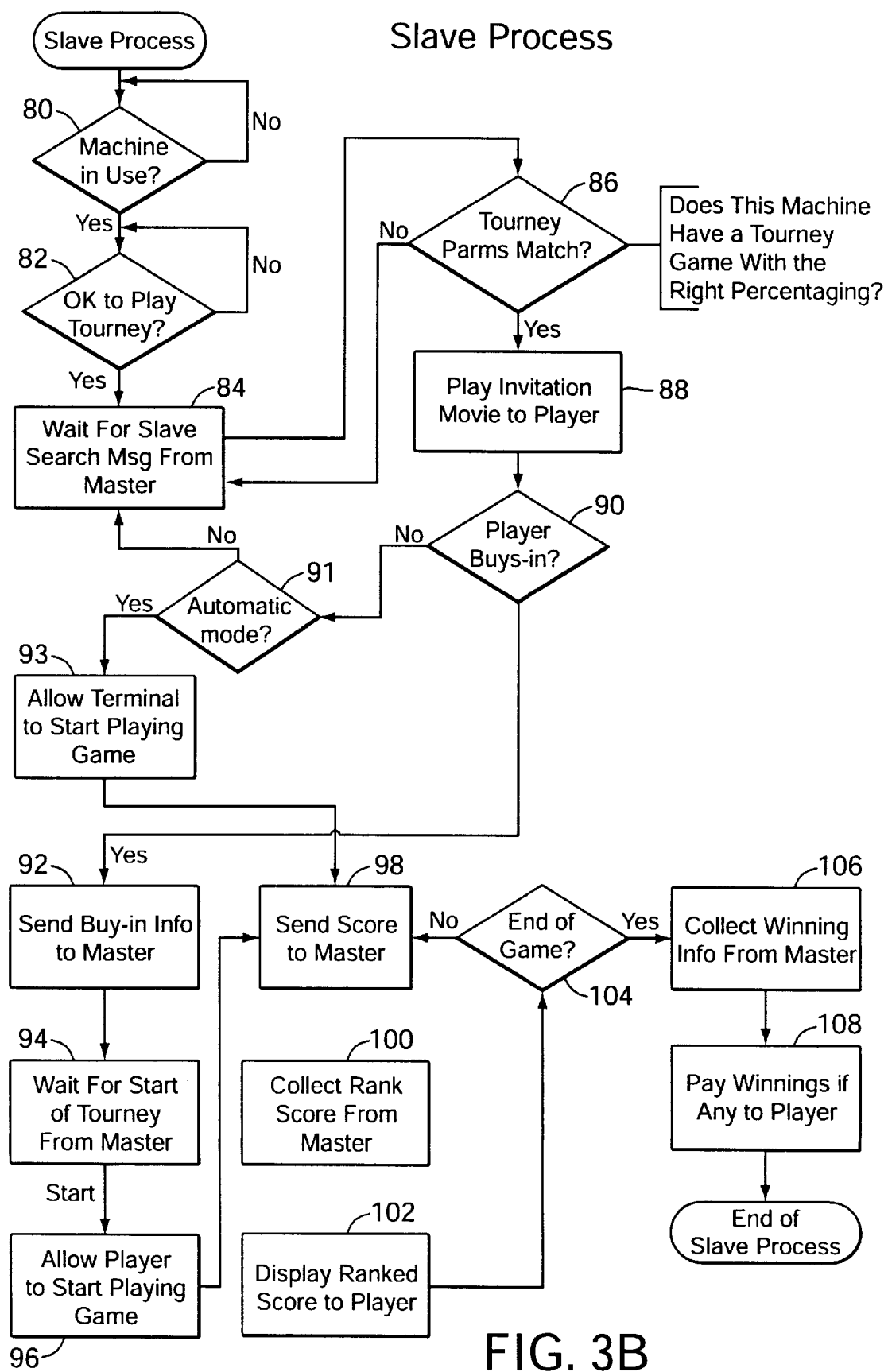

In FIG. 3b, the slave operational process is depicted. First, the unit determines whether or not it is in use (80), and if it is in use, it evaluates the tournament parameters and determines if this machine is available for tournament play (82), has an operator, etc. If the machine is available for tournament play, it waits (84) for the slave search message from the master. When it receives such a message, it checks the parameters (parms): essentially, it determines whether or not this machine has a tournament game with the right percentaging model and all the parameters needed to match (86). If not, it merely waits for someone else to come along and ask for a tournament. If it does match, then it plays the invitation movie or some other announcement to attract the player and entice him to buy in. And if the player buys in (90), the buy-in information is sent (92) back to the master, and the slave unit waits for a START PLAY signal from the master (94). In the meantime, the player can continue playing other games on the machine. Once a START PLAY command is received, the player is allowed (96) to start playing the tournament game, and, as requested, the unit periodically sends the score to the master (98). The unit may also collect the ranked scores (100) from the master and display the scores to the player (102). This may continue until the end of the game, at which time the master will announce the end of the game (104) by asserting an END GAME signal. At the end of the game, the unit will wait for win information from the master (106) and, if there are winnings, the unit will pay them to the player (108).

Although the usual case mentioned above requires as a start condition that a minimum number of terminals be available for play, an alternative play mode might be that if, after a predetermined time has elapsed 63 following the initial tournament announcement (or perhaps an announced start time has passed), the number of available terminals has not reached the maximum 65, the system may designate a number of terminals (either real or virtual) to run in an automatic play mode 91, 93 and thereby meet the minimum terminal requirement. These automatic terminals would play on behalf of the house, and should one of such terminals win the tournament, the winnings would be retained by the house.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of conducting a gaming tounarnent in which a plurality of players participate concurrently in play on individual gaming terminals, the method comprising the steps of:
   connecting a plurality of gaming terminals together to form a network of gaming terminals, wherein each gaming terminal is operative to execute a game of chance having equivalent win probability characteristics and each terminal is operative to receive and transmit the data required to control the play and report the results;
   determining which of the plurality of networked gaming terminals are enabled to participate in the gaming tournament;
   determining that a predetermined start time for the tournament has been reached and that there are not at least a predetermined number of participating terminals;
   designating a number of unattended terminals to participate in the tournament so that the predetermined number of participating terminals is met;
   simultaneously starting tournament play at each of the participating terminals, including any unattended terminals;
   once started, permitting the players to concurrently and continuously play the game one or more times at each of the participating gaming terminals;
   simultaneously ending tournament play at each of the participating terminals, the players at each of the participating terminals having concurrently and continuously played the game over the same time interval;
   collecting from each of the gaming terminals the accumulated score during the same time interval to determine the highest score; and
   identifying the terminal whose player accumulated the highest score.

2. A method of conducting a gaming tournament as recited in claim 1, wherein the step of determining which of the plurality of networked gaming terminals are enabled to participate in the gaming tournament includes the steps of:
   displaying at the terminal the entry fee the player must pay to enter the tournament;
   receiving a report from some or all of the terminals that players at those terminals have paid the entry fee; and
   determining from the reports which terminals are enabled to participate in the gaming tournament.

3. A method of conducting a gaming tournament as recited in claim 1, further comprising the step of permitting tournament play for a predetermined period of time before ending the tournament play.

4. A method of conducting a gaming tournament as recited in claim 1, further comprising the step of permitting tournament play until one of the players accumulates a predetermined winning score before ending the tournament play.

5. A method of conducting a gaming tournament as recited in claim 1, further comprising the step of during the tournament play, continually collecting scores from all of the participating gaming terminals and broadcasting a ranked list of scores to the terminals.

6. A method of conducting a gaming tournament as recited in claim 1, wherein an unattended terminal participating in the tournament plays on behalf of the house and, if such unattended terminal wins the tournament, the house keeps the winnings.

7. A method of conducting a gaming tournament as recited in claim 1, wherein an unattended terminal is a virtual terminal.

8. A method of conducting a gaming tournament as recited in claim 1, wherein an unattended terminal is a real terminal.

9. A method of conducting a gaming tournament in which a plurality of players participate in play on individual gaming terminals that are connected to a master terminal, the method comprising the steps of:
   sending promotional information to gaming terminals available for tournament play, wherein only those terminals having the same game type and percentaging model are available for tournament play;
   collecting buy-ins from the gaming terminals available for tournament play;
   committing, to tournament play the gaming terminals from which buy-ins are collected;
   determining that a predetermined start time for the tournament has been reached and that there are not at least a predetermined number of participating terminals;
   designating a number of unattended terminals to participate in the tournament so that the predetermined number of participating terminals is met;
   starting the tournament at the same time at each of the committed gaming terminals and each of the unattended terminals;
   playing the game at each of the committed gaming terminals and each of the unattended terminals;
   ending the tournament at the same time at each of the committed gaming terminals and each of the unattended terminals so that the game is continuously played at each of the committed gaming terminals and each of the unattended terminals over the same time interval;
   determining the winners; and
   sending pay messages to the winning terminals.

10. A method of conducting a gaming tournament in which a plurality of players participate in play on individual gaming terminals, as recited in claim 9, wherein the end of the time interval occurs at a predetermined time.

11. A method of conducting a gaming tournament in which a plurality of players participate in play on individual gaming terminals, as recited in claim 9, wherein the end of the time interval occurs when one of the players has reached a predetermined winning level of play.

12. A method of conducting a gaming tournament in which a plurality of players participate in play on individual gaming terminals, as recited in claim 9, wherein, prior to starting the tournament, the gaming terminals are available for non-tournament play.

13. A method of conducting a gaming tournament in which a plurality of players participate in play on individual gaming terminals, as recited in claim 9, further including the step of, after the start of the tournament, displaying the progress of each player to the plurality of players at the committed gaming terminals during the tournament play.

14. A method of conducting a gaming tournament in which a plurality of players participate in play on individual gaming terminals, as recited in claim 9, wherein the step of sending promotional information to the available gaming terminals includes the step of sending advertising messages to the terminals to entice a player to play in a tournament at the available gaming terminal.

15. A method of conducting a gaming tournament in which a plurality of players participate in play on individual gaming terminals, as recited in claim 9, wherein the step of sending promotional information to the available gaming terminals includes the step of playing an invitation movie to entice a player to play in the tournament at the available gaming terminal.

16. A method of conducting a gaming tournament in which a plurality of players participate in play on individual gaming terminals, as recited in claim 9, wherein the step of sending promotional information to the available gaming terminals includes the step of playing a pre-programmed announcement that a tournament is to begin at a specified time.

17. A method of conducting a gaming tournament in which a plurality of players participate in play on individual gaming terminals, as recited in claim 9, wherein the step of sending promotional information to the available gaming terminals includes the step of playing a pre-programmed announcement that a tournament is about to begin and an explanation of how the tournament is conducted.

18. A method of conducting a gaming tournament in which a plurality of players participate in play on individual gaming terminals, as recited in claim 9, wherein the step of sending promotional information to the available gaming terminals includes the step of playing a pre-programmed announcement that a tournament is about to begin and the buy-in amount required to participate.

19. A system for conducting a gaming tournament in which a plurality of players participate in play on individual gaming terminals that are connected to a master terminal, the system comprising:

a plurality of gaming terminals;

a master terminal; and a communications network for connecting the master terminal to the plurality of gaming terminals;

wherein the master terminal is operative to send promotional information to the gaming terminals available for tournament play, only those terminals having the same game type and percentaging model being available for tournament play, and wherein the master terminal is further operative to collect buy-ins from the gaming terminals available for tournament plays enable the gaming terminals from which buy-ins are collected to participate in tournament play, determine that a predetermined start time for the tournament has been reached and that there are not at least a predetermined number of participating terminals, designate a number of unattended terminals to participate in the tournament so that the predetermined number of participating terminals is met and to permit the continuous playing of the games over the same time interval for each of the participating gaming terminals.

* * * * *